(12) United States Patent
Constans et al.

(10) Patent No.: US 9,145,200 B2
(45) Date of Patent: Sep. 29, 2015

(54) VEHICLE ENERGY CONTROL SYSTEM WITH A SINGLE INTERFACE

(71) Applicant: AIRBUS OPERATIONS (SAS), Toulouse (FR)

(72) Inventors: Florian Constans, Pibrac (FR); Fabien Perrin, Toulouse (FR); Matthieu Mayolle, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 67 days.

(21) Appl. No.: 13/719,691

(22) Filed: Dec. 19, 2012

(65) Prior Publication Data
US 2013/0184900 A1 Jul. 18, 2013

(30) Foreign Application Priority Data
Dec. 19, 2011 (FR) ...................................... 11 61958

(51) Int. Cl.
*B64C 19/00* (2006.01)
*B64D 31/04* (2006.01)

(52) U.S. Cl.
CPC ................ *B64C 19/00* (2013.01); *B64D 31/04* (2013.01)

(58) Field of Classification Search
CPC .... B64C 19/00; B64C 19/02; B64C 2203/00; B64D 31/04
See application file for complete search history.

(56) References Cited

U.S. PATENT DOCUMENTS

| 2010/0042267 A1* | 2/2010 | Goodman et al. ................. 701/3 |
| 2010/0204855 A1* | 8/2010 | Vial ................................. 701/14 |

FOREIGN PATENT DOCUMENTS

| GB | 2462508 | | 2/2010 | |
| GB | 2462508 A | * | 2/2010 | |
| WO | WO 2006/062416 | | 6/2006 | |
| WO | WO 2006062416 A1 | * | 6/2006 | ............. B63H 21/22 |

OTHER PUBLICATIONS

Search Report for FR 1161958 dated Sep. 12, 2012.

* cited by examiner

*Primary Examiner* — Helal A Algahaim
*Assistant Examiner* — Kelly D Williams
(74) *Attorney, Agent, or Firm* — Nixon & Vanderhye P.C.

(57) ABSTRACT

A method and apparatus for more easily controlling energy of an aircraft. A control interface includes a movable element configured to move along a path, where the path includes two path portions. The path portions are respectively associated with at least two combinations of actuators which affect the energy of the vehicle. At least one of the two combinations of actuators is associated with a current phase of movement of the aircraft. A control unit is configured to generate an energy instruction according to a command associated with a current position of the movable element on one of the two path portions. According to the current phase of movement of the vehicle, the energy instruction is for one of the two combinations of actuators.

19 Claims, 4 Drawing Sheets

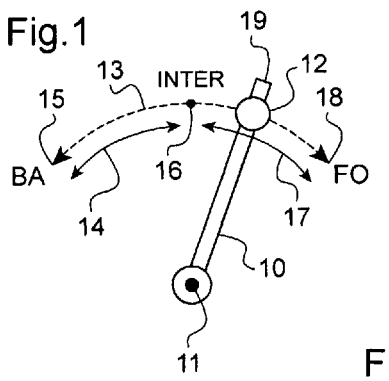
Fig.1
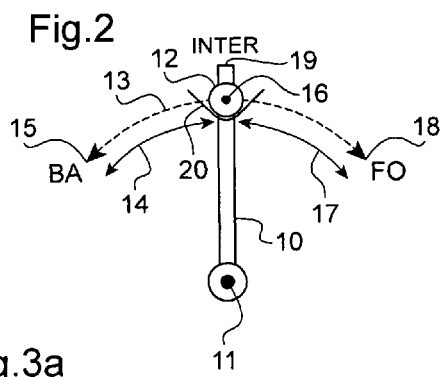
Fig.2
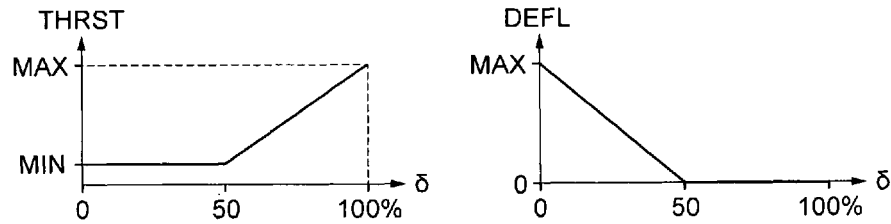
Fig.3a
Fig.3B
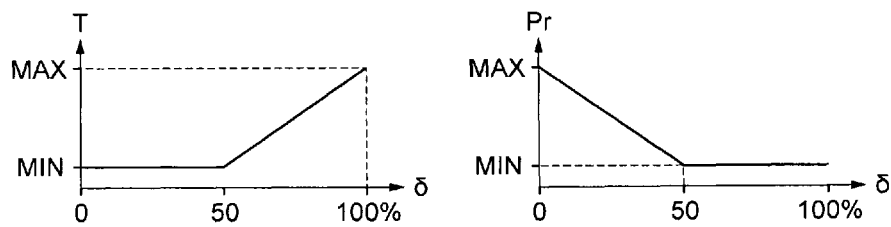
Fig.4

VEHICLE ENERGY CONTROL SYSTEM WITH A SINGLE INTERFACE

The present invention concerns a system for controlling the energy of a vehicle for example such as an aircraft.

The energy of a vehicle may be understood as the mechanical energy of the vehicle, that is to say the sum of its kinetic energy and its potential energy. Typically, this energy is controlled via the thrust of the propulsion means of the vehicle for example such as its engines.

The present description takes the example of aeronautics.

Typically, the energy of an aircraft may be modified by the crew of the aircraft using actuators for example such as:
- the engines of the aircraft which create a positive force (that is to say which increase the energy of the aircraft) in flight and on the ground, or even a negative force (that is to say which reduces the energy of the aircraft) once the aircraft is on the ground under the effect of the thrust reverses.
- the air brakes (or any other drag device or lift-destroying device) which create additional drag, and/or
- the brakes which create a negative braking force.

The control of each of these actuators is conventionally made via specifically dedicated piloting devices. In other words, each actuator is associated with its own piloting device.

Typically, a throttle handle enables the thrust of the engines to be acted upon, another handle enables the brakes to be controlled, another handle enables the level of thrust reversal to be controlled (this handle usually being integrated into the throttle handle) and brake pedals enable the level of braking of the wheels to be controlled.

Each piloting device enables a single actuator at a time to be controlled continuously or discretely.

When the aircraft is on the ground (or when taxiing) the operational objective that the crew sets itself is to control the speed or the acceleration of the aircraft. For this, the crew must act on at least two different piloting devices:
- the thrust handle to accelerate, and
- the brake pedals to slow down.

When these devices are operated, the crew must ensure suitable management is made of the braking so as not to heat the brakes excessively (since this makes them less effective and may degrade performance on take-off, in particular that linked to RTO (Rejected Take Off) and suitable management of the thrust of the engines so as not to consume too much fuel. This optimal management of these two actuators requires good training of the crew and an implementation that is appropriate to the situation.

When the aircraft is in flight, the piloting objective for the crew is to maintain a speed or an acceleration/deceleration. For this, the crew must act on at least two different devices:
- the thrust handle to accelerate or decelerate, and
- the air brake control handle to increase the deceleration or maintain a constant speed in descent.

When the aircraft is in descent, it is sometimes necessary to use the air brakes to maintain a constant speed or reduce the speed. However when the aircraft attains level flight, the autothrottle system (or the crew) adjusts the thrust, but must also retract the air brakes which implies an action on both control devices.

There is a risk of the crew forgetting the air brake control actuator, so causing an increase in the thrust of the engines with the aim of compensating for the drag needlessly created by the air brakes and thus causing overconsumption of fuel.

When the aircraft is on the ground, during the deceleration phase after a landing, the crew has available several means for managing the energy of the aircraft. The crew may act on:
- the brake pedals,
- the reverse thrust handle, and/or
- possibly, the airbrakes.

The brakes have a different efficiency depending on the state of the runway (which may in particular be dry, wet, covered with snow or contaminated by rubber or other contaminant) whereas the efficiency of the thrust reverses is not affected by the state of the runway. These latter have however a dynamic over time (the time to extend the mechanism) and cause noise, additional consumption and increased wear of the engines. The optimum management of these two actuators thus presents an operational issue and requires the pilot to have a good knowledge of the behavior of the aircraft.

There thus exist several cases in which the manual control of the energy of the aircraft (kinetic energy on the ground and the kinetic and potential energy in flight) by the crew requires them to be well-trained, in particular if they seek to optimize the use of the actuators.

To increase or reduce the speed, or to adjust the acceleration of the aircraft on its trajectory, it is sometimes necessary to pass from one actuator to the other. This makes the task of the crew member more delicate since he must pass from one piloting device to another.

If the crew forgets one of the actuators in an intermediate position, the case may arise in which the actuators "conflict" with each other needlessly, one of the actuators coming to compensate for the effort of the actuator whose control device has been forgotten by the crew in the wrong position. This involves cases of sub-optimization in operational terms (increased consumption, fatigue of the structure, reduced piloting precision). For example, the crew may inadvertently leave a brake activated when it commands an acceleration. In this case, the acceleration must compensate for the effect of the brake and the latter risks becoming needlessly worn.

The multiplicity of the means for controlling the energy of the aircraft means that, in certain cases, the piloting of the aircraft is not easy. The control of these specific means is a task requiring the crew to have good knowledge of the aircraft and it is the crew's task to use the different actuators optimally.

There is thus a need to improve vehicle energy control systems.

The present invention lies within this context.

To that end, according to a first aspect of the invention, there is provided a vehicle energy control system characterized in that it comprises:
- a control interface, said control interface comprising a movable element configured to move along a path, said path defining at least two path portions respectively associated with at least two combinations of actuators acting on the energy of said vehicle, and
- a control unit configured to generate an energy instruction according to a command associated with a current position of said movable element on one of said at least two path portions, for the associated combination of actuators.

The energy of the vehicle corresponds for example to its kinetic energy, its potential energy or the sum of these two energies. The kinetic energy of the vehicle varies in particular according to its velocity, and the potential energy of the vehicle varies in particular according to its altitude. The variation of the energy of the vehicle may be controlled via its propulsive balance, corresponding to the difference between the thrust applied to the vehicle by its engines and the aerodynamic drag of the vehicle.

For example, to control the variation in the energy of the vehicle, and the speed of that variation, in particular the thrust of the engines and the aerodynamic parts of the aircraft are controlled (air brakes or other parts).

It is possible for a combination of actuators to comprise only one actuator. The same actuator may form part of two different actuator combinations that are associated with two respective path portions.

For example, in flight, to comprise the energy of the aircraft, it is possible to increase the thrust of the engines and simultaneously reduce the drag by reducing the effect of the air brakes. To reduce the energy, it is possible to reduce the thrust of the engines and increase the drag by increasing the effect of the air brakes. Thus, depending on the path of the lever, different combinations of actuators are implemented.

Depending on the current position of the movable element of the interface, different distinct combinations of said actuators may be implemented (for example, the thrust of the engines may take different values comprised between idle and maximum thrust, the air brakes may be disposed according to several possible configurations, or other combination).

For example, on the ground, a combination of actuators may comprise engines, brakes, and/or wheel motors adapted for airport navigation.

The system according to the invention enables drawbacks of the prior art systems to be overcome since the crew can manage the control of the energy of the vehicle by means of a single interface. The crew manipulates only a single interface which enables several actuators to be controlled according to the position of the movable element and which may possibly depend on the phase of movement of the vehicle, optimization criteria, flight conditions, and known faults if any.

Furthermore, the interface makes it possible to avoid simultaneously commanding combinations of actuators having opposite effects. For example, if one path portion is associated with an engine and one path portion is associated with a brake, it is possible for these two actuators not to be commanded simultaneously.

The path of the movable element may comprise two path portions or more. This path may take various forms (straight line, curve or portions of both types).

A system according to the first aspect of the invention enables the piloting to be facilitated by providing the control of different actuators or groups of actuators by the same movement of the movable element of the interface.

The path portions may be associated with one or more actuators. This association may be static, that is to say that each path portion is associated uniquely with an actuator or a group of actuators.

Alternatively, this association changes over time, depending on the flight parameters, the system taking on the task of optimally employing the available actuators by virtue of embedded efficiency models.

The present invention enables the risk of improper manipulation by a crew member to be reduced by reducing the number of interfaces to actuate to control the actuators and by grouping together the control of those actuators in the same interface.

According to embodiments, the control unit is configured to generate said energy instruction according to a current phase of movement of the vehicle.

This phase of movement corresponds for example to an acceleration, a deceleration, an emergency maneuver or something else. For an aircraft, this phase corresponds for example to a flight phase or a phase on the ground.

Thus, it is possible to associate the same path portion with different actuators depending on that flight phase.

The interface may for example comprise an element for selecting said current phase of movement, for example such as a button on the interface.

According to some embodiments, the interface is a mechanical interface.

For example, the movable element comprises a lever, said combinations of actuators being associated with path portions of the lever.

Thus, the interface is intuitive for crews used to lever controls.

According to some embodiments, the interface is a graphical interface.

The graphical interface may for example be a touch screen, a touch pad or something else.

The movable element may then be a graphical element, for example an icon, a "widget" or another type of tactile graphical interface interaction means.

For example, a cursor is displayed on a touch screen and the crew member may move it by touching the screen.

This type of interface may meet the need to reduce bulk in piloting stations such as cockpits. Furthermore it avoids the mechanical wear of parts and requires a lower amount of maintenance.

According to some embodiments, the interface combines mechanical and graphical elements. For example, a cursor is displayed on screen and the member of the crew presses on directional keys to move the cursor.

The combinations of actuators associated with the path portions may for example comprise motive devices of the vehicle (motor, engine or other device), and/or braking devices (brakes, air brakes, or other device).

According to some embodiments, to determine the instruction to generate, the system accesses one or more allocation tables storing for at least two respective positions on said at least two path portions, the associated command and combination of actuators.

Thus, it is possible to define the instructions generated according to each position of the element in the path portions and/or according to predefined flight phases or conditions. Furthermore, the system may select, from among a plurality of tables, the relevant table according to the flight conditions, the flight phase or something else.

A second aspect of the invention concerns an aircraft comprising a system according to the first aspect, for example an aircraft.

A third aspect of the invention concerns a method of controlling the energy of a vehicle.

A fourth aspect of the invention concerns a computer program as well as a computer program product and a storage medium for such program and product, enabling the implementation of a method according to the third aspect when the program is loaded into and executed by a processor of a vehicle energy control system.

The objects according to the second, third and fourth aspects of the invention procure at least the same advantages as those procured by the system according to the first aspect. The objects according to the third and fourth aspects may implement steps corresponding to optional features of the system according to the first aspect.

Other features and advantages of the invention will appear on reading the present detailed description which follows, by way of non-limiting example, and of the appended drawings among which:

FIGS. 1, 2 and 5 illustrate mechanical interfaces according to some embodiments;

FIGS. 3a and 3b are graphs representing the change, over time, of instructions according to the movement of the movable element of the interface.

FIG. 4 illustrates an allocation table according to one embodiment;

Figure 9:
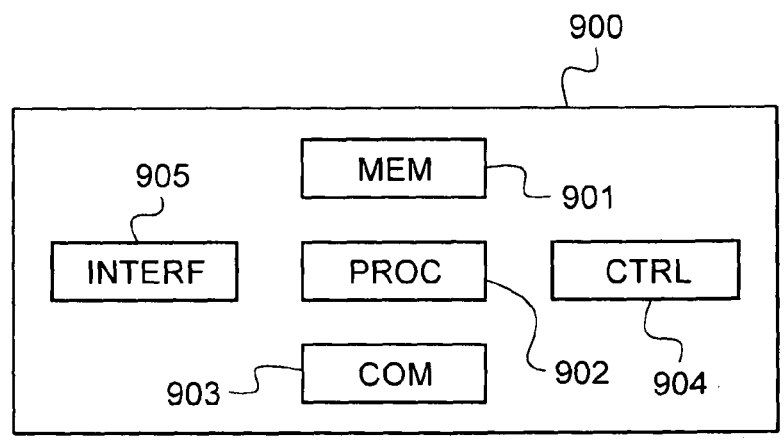

FIG. 9 diagrammatically illustrates a control system according to one embodiment.

The invention provides a system for controlling the energy of a vehicle, such as an aircraft, by the crew of the vehicle, by means of a single piloting device. The system comprises a control unit to generate an energy instruction on the basis of which feedback control is performed of the current parameter of energy of the vehicle and comprises a movable element of which the decomposition of the kinematics enables instructions to be generated on the different actuators acting on the energy of the vehicle.

The energy parameter may for example be:
- the total slope resulting from the propulsive balance of the vehicle (a quantity which corresponds to the energy variation of the vehicle),
- the acceleration of the aircraft on the trajectory (a quantity which corresponds to the variation in velocity of the vehicle),
- the target velocity over which the autothrottle system performs feedback control (a quantity which corresponds to the variation in velocity of the vehicle),
- a hybrid parameter based on the engine running parameters and the deflection of the air brakes,
- a hybrid parameter based on the engine running parameters and the brake pressure for the wheels, or
- a combination of the parameters cited above.

The energy parameter may possibly vary according to the current phase of flight (take-off, landing, hover, descent, climb or other phase).

The system may for example form part of a device for assisted control of the acceleration on a trajectory of an aircraft in flight and on the ground The system for example makes it possible to control, by means of a single element of the interface:
- in flight, the engines providing the propulsion of the aircraft and the air brake devices adjusting the drag of the aircraft, and
- on the ground, the engines and the wheel brakes.

Of course, the number and the type of actuators controlled are not limited to those presented above.

FIG. 1 illustrates an interface according to one embodiment. This interface comprises a lever 10 which may pivot around a rotational axis 11 orthogonal to the plane of the Figure and of which the free end 12 (which is movable) is able to travel along a path 13. This path comprises a first path portion 14 between a first fully back end position 15 (BA) and an intermediate position 16 (INTER) and a second path portion 17 between the intermediate position and a second fully forward position 18 (FO).

For example, when the free end of the lever is located on the first path portion, the interface enables the brakes or the air brakes to be controlled and when the free end of the lever is on the second path portion the interface enables the aircraft engines to be controlled.

In the first path portion, in order to determine which of the air brakes or of the brakes are being controlled, the system may receive a signal from a sensor configured to determine whether the aircraft is on the ground (in which case it is the brakes that are controlled) or whether it is in flight (in which case it is the air brakes that are controlled).

Alternatively, the interface may comprise a key (button) 19 enabling the pilot to indicate to the system whether the aircraft is in flight or on the ground. This key may for example be located on the lever, at the location of the free end, as represented in FIG. 1.

In order to enable the pilot to find the intermediate position, the interface may comprise, at the intermediate position, an intermediate notch 20 as represented in FIG. 2.

FIG. 2 includes all the parts of FIG. 1 with the same reference signs. This intermediate notch enables the pilot, thanks to a physical sensation of force, to easily find the median point of passage of the control from one actuator to another.

The path of the movable end of the lever is for example measured with a parameter $\delta$ varying from 0 to 100%. For the first end position 15 (BA) the parameter has the value 0%, for the second end position 18 (FO) the parameter has the value 100%. The parameter varies proportionally with the angle formed between the axis of the lever and the axis passing through the first fully back end position and intersecting with the rotational axis of the lever. Thus, for the intermediate position 16 (INTER) the parameter has for example the value 50%. The intermediate position could be associated with another value, the example here not being limiting.

According to the position of the free end of the lever, an instruction is generated for an actuator. This instruction may also depend on the state of the aircraft (on the ground or in flight).

FIG. 3a illustrates the change in the instructions according to the value of the parameter $\delta$, when the aircraft is in flight.

When the aircraft is in flight and the free end of the lever is moved between the intermediate position ($\delta$=50%) and the fully forward position ($\delta$=100%), the instruction generated corresponds to the command for thrust (THRST) of the engines (for example the parameter N1, that is to say a parameter relating to the rotational parameters). This thrust is at its minimum (engines idling) for $\delta$ between 0 and 50% then it increases to its maximum for $\delta$ between 50% and 100%.

When the aircraft is in flight and the free end of the lever is moved between the fully back position ($\delta$=0%) and the intermediate position ($\delta$=50%), the instruction generated corresponds to the command for the deflection (DEFL) of the air brakes (for example the angle of deflection). This deflection is complete for $\delta$=0% then it decreases until it is nil for $\delta$=50%, it then maintains that value until $\delta$=100%.

FIG. 3b illustrates the change in the instructions according to the value of the parameter $\delta$, when the aircraft is on the ground.

When the aircraft is on the ground and the free end of the lever is moved between the intermediate position ($\delta$=50%) and the fully forward position ($\delta$=100%), the instruction generated corresponds to the command for thrust (THRST) of the engines (for example the parameter N1). This thrust is at its minimum (engines idling) for $\delta$ between 0 and 50% then it increases to its maximum for $\delta$ between 50% and 100%.

When the aircraft is on the ground and the free end of the lever is moved between the fully back position ($\delta$=0%) and the intermediate position ($\delta$=50%), the instruction generated corresponds to the command for pressure (Pair) of the brakes. This pressure is maximum for $\delta$=0% then it decreases until it is nil for $\delta$=50%, it then maintains that value until $\delta$=100%.

The commands may depend on the point in flight in order to facilitate piloting with regard to energy.

Thus, if the member of the crew moves the lever into a fully forward position, he commands the maximum acceleration of the aircraft (engine full thrust and air brakes retracted) by a single movement. This is not the case on aircraft of the prior art in which the control of the air brakes and of the engines are made separately, through two specific distinct interfaces.

An exterior device may be provided that is capable of determining whether the aircraft is situated in approach phase and/or in particularly turbulent conditions, with a high windshear risk. In this case, the control system may for example be configured to receive from that device a signal representing that information. Alternatively, the crew may indicate to the system that it considers the approach difficult on account of the high turbulence or on account of the frequent presence on the terrain in question of windshear phenomena (indication based on the pilot's experience) by means of a button provided for that purpose.

To determine the command to generate and the actuator to which to send the command, the control system may have access to one or more allocation tables. Such an allocation table 40 is represented in FIG. 4. For different values of the parameter δ, each actuator (brake, air brake, engine or motor or other actuator) capable of being controlled by the system has a value of its instruction parameter stored in the table. In the table 40 represented in FIG. 4, for the value δ=1%, the brake, having the braking pressure as instruction parameter, is associated with the value Pr1. For the value δ=99%, this instruction parameter is at the value Pr99. The air brake, which has the deflection angle as instruction parameter, is also associated with different values DEFL0, DEFL1, . . . , DEFL99, DEFL100 depending on the value of the parameter δ. Each engine may be associated with its own instruction parameter (for example the parameter N1), alternatively it being possible to envision a parameter associated with all the engines of the aircraft, that parameter or those parameters being associated with values THRST0, THRST1, . . . , THRST99, THRST100 according to the value of the parameter δ.

The table 40 may contain other information concerning other actuators. In the example of FIG. 4, the values of the parameter δ are given with a step size of 1%, it being possible to envision other step sizes, or to store instruction parameter values for ranges of values of the parameter δ.

Where the instruction parameter values depend on the phase of flight of the aircraft, or on one or more other parameters, the table may, for the same value of the parameter δ, store several values. For example, for the engine, and for δ=1%, the table may store a value THRST1_ground and a value THRST1_flight which the control system uses depending on whether the aircraft is respectively on the ground or in flight.

Alternatively, several tables respectively corresponding to the different flight conditions, phases of flight or other indications supplied to the control system by the crew or by sensors, are stored and the control system uses the relevant table.

The allocation tables may be stored statically without modification during the movement of the aircraft. It is also possible to envision a dynamic modification of these tables to adapt the values stored in the table or tables depending on events such as a failure or particular flight conditions. It is then possible to envision to reduce or increase the instruction parameter values according to predetermined rules.

For example, when an approach is made, it is possible to envision keeping the engines at a higher level than the reduced level on account of the deflection of the air brakes, the engines compensating for the drag caused by the air brakes. Thus, in case of windshear, the crew may move the single energy control lever to command full thrust of the engines, as well as an immediate retraction of the air brake devices. Advantageously, the engines are stabilized in advance at a level appreciably above the idle level to reduce their time of reaction to attain full thrust.

In a variant, it may be considered that the high level objective (total slope, acceleration on trajectory, etc.) leads to a simultaneous use of several actuators so as to profit from the fastest actuators.

In a variant of the embodiment described earlier, the lever may be associated with a spring creating a return force. When the lever is released, it then returns to an initial resting position. The control information δ is then determined by integration of the deflection value of the lever (accuracy possibly being limited by a conversion coefficient). This is then a case of linear kinematics. Other types of kinematics may be envisaged.

Figure 5:
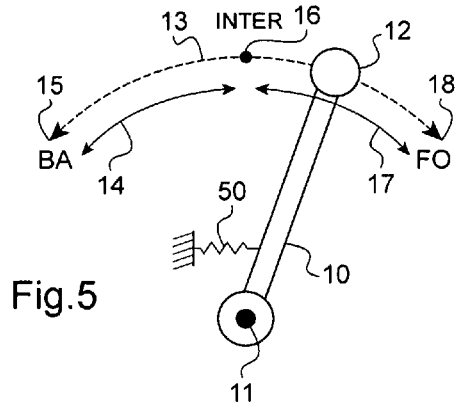

FIG. 5 represents such a lever. FIG. 5 includes all the parts of FIG. 1 with the same reference signs. This time, the lever is returned to the intermediate position by a return spring 50. This spring may be coupled to a damper (not shown) to avoid oscillations when the lever returns to the intermediate position.

The angle formed between the axis of the lever and the axis passing through the intermediate position and intersecting the rotational axis of the lever represents the speed of variation of the parameter controlling the actuator associated with the path portion on which the free end of the lever is situated. Thus, the greater this angle the faster the parameter variation commanded by the instruction. If the angle is positive, this variation is an increase and if the angle is negative, this variation is a reduction. In the resting position, the instruction is nil.

By maintaining the lever in a position, the pilot maintains the speed of variation of the parameter constant.

FIGS. 1, 2 and 5 represent mechanical interfaces with the movement of a lever. The present invention is not limited to that type of interface. Other types of mechanical interface are possible for example such as a wheel or other mechanical interface. It is also possible to envision a graphical interface comprising a touch screen displaying the movable element according to the invention. The pilot then moves the movable element by touching the screen.

Figure 6A:
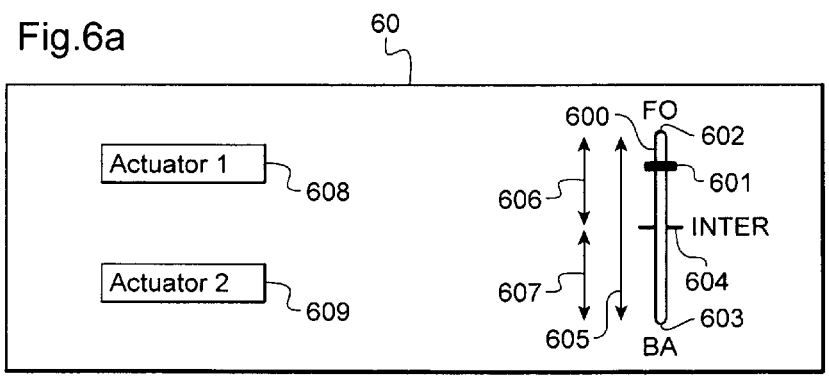
FIGS. 6a and 6b illustrate graphical interfaces according to some embodiments.

Such a graphical interface 60 is represented in FIG. 6a. This interface comprises a vertical gauge 600 in which a movable cursor 601 is able to move between an upper end position 602 (FO) and a lower end position 603 (BA), the intermediate position 604 (INTER) being marked by a horizontal line. The path 605 of the cursor in this example is a straight line and breaks down into a first path portion 606 between the intermediate position 604 and the upper end position 602 and into a second path portion 607 between the lower end position 603 and the intermediate position 604. The parameter δ then varies from 0% to 100% when the cursor moves from the position 603 to the position 602.

To enable the pilot to know which actuators are controlled by the interface, indicators 608 and 609 may be displayed at the location of the path portions 606 and 607. Thus the pilot can see that, if the flight phase changes, for example in the portion 607 the system no longer controls the brake but now controls the air brake.

The displays 608 and 609 may also comprise a touch key enabling the pilot to configure the interface and himself choose the actuator that he wishes to control. For example, when he presses on a display, a scrollable list displays and he then chooses the actuator from the list.

Figure 6B:
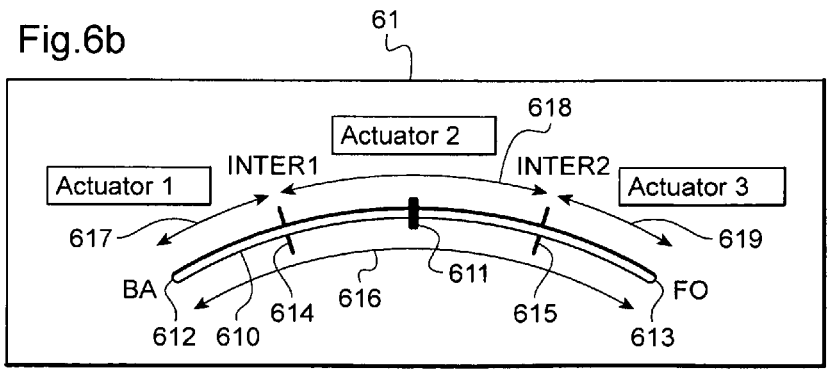

Another type of graphical interface 61 is represented in FIG. 6b. This interface comprises a curved gauge 610 in which a movable cursor 611 is able to move between a left end position 612 (BA) and a right end position 613 (FO). In this example, the gauge comprises two intermediate positions 614 (INTER1) and 615 (INTER2). This positions are marked by substantially vertical lines. The path 616 of the cursor in this example is curved and breaks down into a first path portion 617 between the left end position 612 and the first intermediate position 614, and a second path portion 618 between the first intermediate position 614 and the second intermediate position 615, and into a third path portion 619 between the second intermediate position 615 and the right end position 613. The parameter δ then varies from 0% to 100% when the cursor moves from the position 612 to the position 613.

To enable the pilot to take account of which actuators are controlled by the interface, indicators 620, 621 and 622 may be displayed at the location of the path portions 617, 618 and 619. As for the interface of FIG. 6a the displays may also comprise a touch key enabling the pilot to configure the interface and himself choose the actuator he wishes to control. For example, when he presses on a display, a scrollable list displays and he then chooses the actuator from the list.

It should be noted that the presence of three path portions is not limited to the example of the curved path. In the example of FIG. 6a, it is possible to define two, three, four or more straight path portions. The possibility of combining several shapes of path should also be noted, for example combining straight and curved path portions. It is also possible to define several path portions for mechanical interfaces such as represented in FIGS. 1, 2 and 5.

Lastly, it should be noted that mechanical interfaces may have movable elements having straight or curved paths or paths combining both types.

The graphical interfaces may also comprise one or more touch keys to select a phase of movement of the aircraft (for example in flight, on the ground or other phase).

Figure 7:
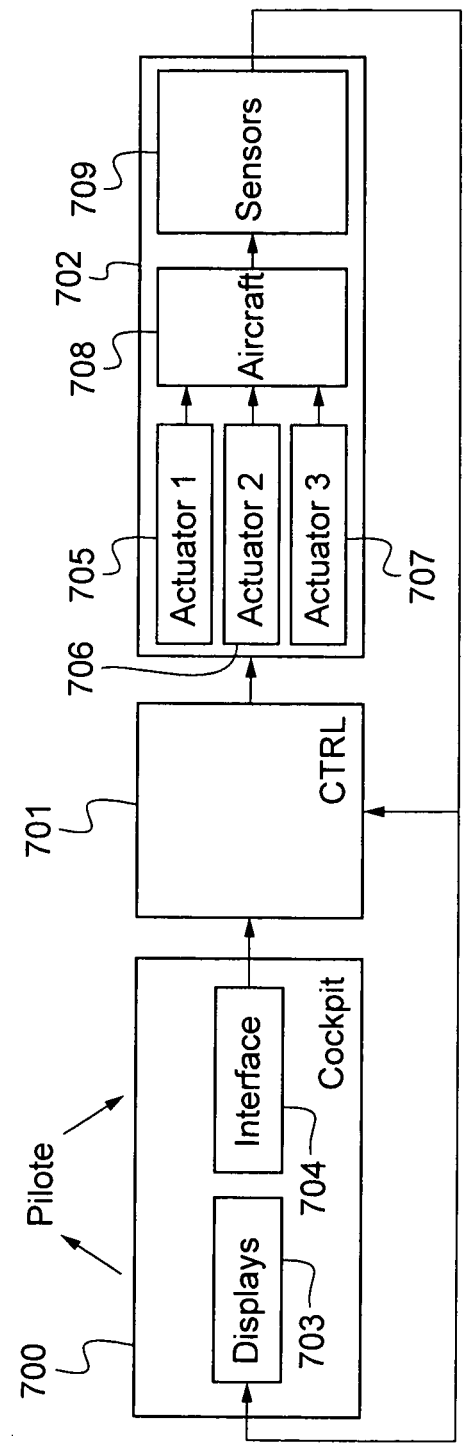
FIG. 7 illustrates a general architecture for a control system according to one embodiment.

FIG. 7 represents a general architecture for a control system according to one embodiment of the invention.

This architecture breaks down into three modules 700, 701 and 702.

The first module 700 forms part of the cockpit of the aircraft. It comprises a set of displays 703 to display aircraft control data to the members of the crew in the cockpit. Thus, the crew has information feedback on the state of the aircraft including, among others, the propulsive balance (also called total slope of the aircraft and designating the instantaneous variation in the sum of the kinetic energy and potential energy of the aircraft), from the slope of the aircraft (that is to say the angle between the instantaneous velocity vector of the aircraft and the horizontal plane), from the current thrust level of the engines and from the commanded thrust level of the engines, or other information relative to other actuators (brakes, air brakes or other actuators). This information may be displayed in particular on a Head Up Display, on a Navigation Display, on a Primary Flight Display, on a screen dedicated to the state of the actuators, or other display.

The module 700 also comprises an interface 704 for a system according to the invention. Thus, a member of the crew, for example the pilot, takes account of the displayed data and takes decisions as to the change in the energy of the aircraft, he then acts on the interface 704 (for example a lever) to give orders for reducing or increasing the energy of the aircraft.

The module 700 is connected to a control unit 701. As input the control unit receives a control value from the interface 704 (for example the angular position of a control lever).

The control unit 701 is for example an on-board computer configured to convert the command value from the interface, for example the value of an angle, into an aircraft energy instruction. This instruction may for example correspond to an order for variation of the thrust of the engines to make the velocity of the aircraft vary (and thus its kinetic energy) or to make the altitude of the aircraft vary (and thus its potential energy). Depending on the position of the movable element of the interface, the module 701 determines the energy instruction to generate and determines which actuator to send the instruction to. For example, the control unit uses an allocation table as presented above.

Alternatively, this association changes over time, depending on the flight parameters, the system taking on the task of optimally employing the available actuators by virtue of embedded efficiency models.

The control unit delivers an energy instruction to a unit 702 comprising the different actuators 705, 706, 707 that can be controlled via the interface 704. The energy instruction is directed to the actuator concerned. That actuator then acts on the dynamics of the aircraft represented by a block 708. A measuring unit 709 then measures a certain number of items of information concerning the actuators and the dynamics of the aircraft (velocity, altitude, position of the air brakes, current power of the engines or other information) to deliver them to the control unit 701 and to display them on the displays 703.

In the preceding example, the control parameter corresponds to the thrust of the engines, however, it may be otherwise and the control parameter may be a high level parameter such as the acceleration or the variation in total energy of the aircraft (the latter is given by the propulsive balance or the total slope) of the aircraft.

Figure 8:
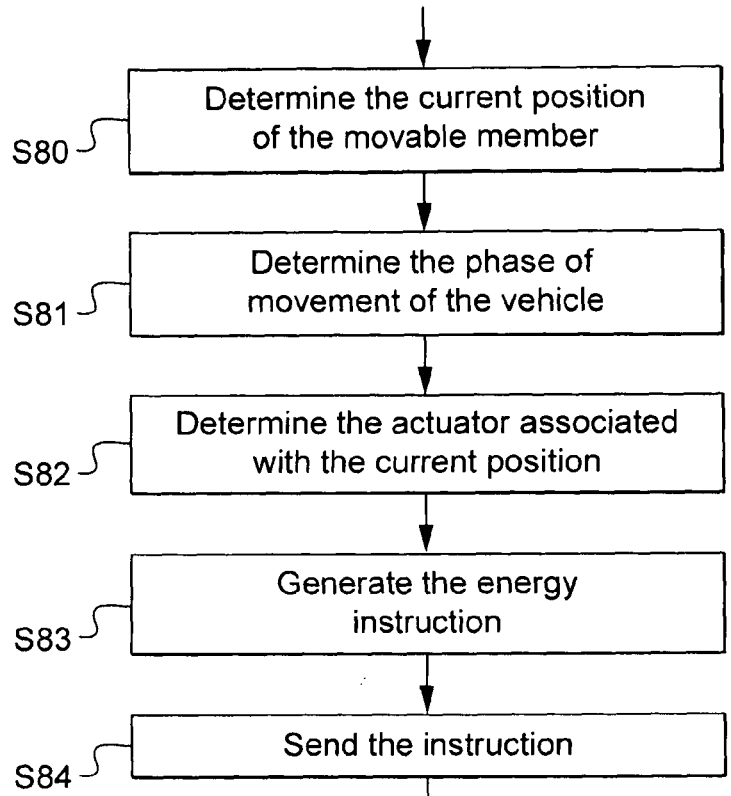
FIG. 8 is a flow chart of steps of a method according to one embodiment.

FIG. 8 is a flow chart of the steps of a method for controlling energy of a vehicle according to one embodiment. This method may for example be implemented by a system according to FIG. 7.

At a step S80, an energy control system determines the current position of the movable element of the control interface.

Once the position of the movable element is known, the phase of movement which the vehicle is in is determined at a step S81. In the example of the aircraft, it is determined whether the aircraft is on the ground or in flight (for example by reception of a signal from an element of the interface that the pilot can use to indicate the phase of movement or from a specific sensor). Thus, at a step S82, it can be determined what combination of actuators each path portion is associated with. It is to be noted that it is possible for a combination of actuators to comprise only one actuator.

An instruction is then generated at a step S83 depending on the phase of movement and the position of the movable element. For example, this instruction is generated by access to an allocation table as represented in FIG. 5. The method may then comprise a step (not shown) of selecting the relevant allocation table depending on the flight phase and/or other parameters (conditions of flight other parameters). The instruction generated at step S83 may comprise several subinstructions respectively intended for actuators of a combination of actuators.

Once generated, at a step S84, the instruction is sent to the actuators (or to the actuator) of the combination of actuators that is associated with the position of the element and with the phase of flight.

A computer program for the implementation of a method according to one embodiment of the invention may be produced by the person skilled in the art on reading the flow chart of FIG. 8 and the present detailed description.

FIG. 9 illustrates a control system according to one embodiment. The system 900 comprises a memory unit 901 (MEM). This memory unit comprises a random access memory for temporary storage of the computing data used during the implementation of a method according to an embodiment. The memory unit furthermore comprises a non-volatile memory (for example of EEPROM type) for example for storing a computer program according to an embodiment for its execution by a processor (not represented) of a processing unit 902 (PROC) of the system. The memory may also store one or more allocation tables as represented in FIG. 5.

The device furthermore comprises a communication unit 903 (COM) to perform communication, in particular with actuators such as engines or motors, air brakes or other actuators. The communication unit may also serve to receive data for updating the allocation tables or signals designating a current flight phase.

The system also comprises a regulating unit 904 (CTRL) similar to the unit 701 described with reference to FIG. 7 and an interface 905 (INTERF) with a movable member as described earlier Of course, the present invention is not limited to the described embodiments, other variants and combinations of features are possible. The description of a feature in one embodiment does not exclude the possibility of using that feature in another embodiment.

The present invention has been described and illustrated in the present detailed description and in the Figures. The present invention is not limited to the embodiments presented. Other variants and embodiments may be deduced and implemented by the person skilled in the art on reading the present description and appended Figures.

In the claims, the term "comprise" does not exclude other elements or other steps. The indefinite article "a" does not exclude the plural. A single processor or several other units may be used to implement the invention. The different features presented and/or claimed may advantageously be combined. Their presence in the description or in the different dependent claims does not exclude this possibility. The reference signs are not to be understood as limiting the scope of the invention.

The invention claimed is:

1. An energy control system for an aircraft controlled by an operator, said system comprising:
    a control interface comprising an operator adjusted movable element configured to move along a path, said path defining at least two path portions;
    at least two combinations of actuators acting on an energy parameter of said aircraft; and
    a control unit configured to generate an energy change instruction according to a command associated with a current position of said movable element on one of said at least two path portions, and, said energy change instruction being for the combination of actuators currently associated with the path portion on which the moveable element is positioned;
    wherein at least one path portion of said at least two path portions has a non-fixed association with different combinations of actuators, and a current association between said at least one path portion and one combination of actuators depends on a current phase of movement of the aircraft; and said energy change instruction depends on said current phase of movement of the aircraft.

2. The system according to claim 1, further comprising at least one of a sensor and an interface element configured to determine said current phase of movement of the aircraft.

3. The system according to claim 1, wherein the interface comprises an element for selecting said current phase of movement.

4. The system according to claim 1, wherein said interface comprises a mechanical element.

5. The system according to claim 4, wherein said interface further comprises a screen configured to display a cursor able to be moved by said operator by pressing directional keys.

6. The system according to claim 1, wherein the interface is a graphical interface, a cursor being displayed on a touch screen, and movement of said cursor is controlled by said operator touching the screen.

7. The system according to claim 1, wherein the movable element comprises a lever, and the at least two path portions corresponds to movements of the lever.

8. The system according to claim 1, wherein one of said at least two combinations of actuators comprises a motive device of the aircraft.

9. The system according to claim 1, wherein one of said at least two combinations of actuators comprises a braking device of the aircraft.

10. The system according to claim 1, wherein the control unit is configured to access, when generating the energy change instruction, one or more allocation tables storing, for at least two respective positions on said at least two path portions, the associated command and combination of actuators.

11. An aircraft comprising a system according to claim 1.

12. A method of controlling a system for controlling the energy of an aircraft comprising:
    determining a current phase of movement of the aircraft;
    determining a current position along a defined path of a movable member of a control interface of the system, said defined path defining at least two path portion;
    associating at least two different combinations of aircraft actuators with one of the two path portions of said defined path;
    associating at least one of said at least two combinations of actuators associated with said current phase of movement of the aircraft; and
    generating an energy change instruction according to a command associated with said current position of said movable element, and, according to said current phase of movement of the aircraft, said energy change instruction is directed to the combination of actuators associated with the path portions including the current position of said movable element and associated with the current phase of movement of the aircraft.

13. The method according to claim 12, wherein one of said at least two combinations of actuators comprises a motive device of the aircraft.

14. The method according to claim 12, wherein one of said at least two combinations of actuators comprises a braking device of the aircraft.

15. The method according to claim 12, wherein generating the energy change instruction comprises accessing an allocation table storing, for each state of the interface, an associated command to the associated combination of actuators.

16. A computer program stored on a non-transitory computer readable storage medium which, when executed by a data processor in a system for controlling energy of an aircraft cause the system to:

associate at least two different combinations of aircraft actuators with one of the two path portions of said defined path;

associate at least one of said at least two combinations of actuators associated with said current phase of movement of the aircraft; and generate an energy change instruction according to a command associated with said current position of said movable element, and, according to said current phase of movement of the aircraft, said energy change instruction is directed to the combination of actuators associated with the path portions including the current position of said movable element and associated with the current phase of movement of the aircraft.

17. An aircraft energy control system for an aircraft comprising:

an operator controlled energy control lever biased towards a neutral position, while positioned forward of said neutral position, the energy control lever applying to control unit a command for an increase in aircraft energy and while positioned rearward of said neutral position, the energy control level applying to the control unit a command to decrease the aircraft energy, wherein a desired rate of change of aircraft energy increases based on a displacement of the energy control level from said neutral position;

a first combination of actuators each coupled a corresponding aircraft energy increasing device and a second combination of actuators each coupled to one or more aircraft energy decreasing devices, the control unit configured to generate an energy increase instruction to a the first actuator when said control lever is forward of said neutral position and an energy decrease instruction to at a selected actuator of the actuators in said second combination of actuators when said control lever is rearward of said neutral position, wherein the control unit is configured to select the selected actuator based on a current phase of the aircraft.

18. An energy control system for an aircraft comprising:

a control interface in the aircraft and including a movable control element confined to be manually moved along a defined control path, wherein the control path includes control path portions;

a first actuator configured to act on an aircraft energy increasing component;

a second combination of the actuators each of which acts on a different aircraft energy decreasing components, wherein the different aircraft energy decreasing components include components configured to be actuated during a first phase of movement of the aircraft and other components configured to be actuated during a second phase of movement of the aircraft, and a control unit including a processor and a non-transitory memory storing instructions which are processed by the processor to cause the control unit to: (i) select the first actuator or the second combination of the actuators based on which control path portion in which the control element is currently positioned, (ii) select one or more but not all of the actuators in the second combination based on a current phase of movement of the aircraft, and (iii) generate an energy change command for the selected first actuator or the selected one or more by not all of the actuators in the selected second combination, wherein the energy change command is applied adjust the aircraft energy.

19. A control system for an aircraft comprising:

a control interface in the aircraft and including a movable control element confined to be manually moved along a defined control path, wherein the control path includes a first portion and a second portion;

an engine thrust actuator configured control a forward thrust of an engine wherein the thrust moves the aircraft;

an airbrake actuator configured to control an airbrake on a wing of the aircraft;

a landing actuator configured to cause the engine to reverse thrust or control a brake on a wheel of the aircraft, a control unit including a processor and a non-transitory memory storing instructions which are processed by the processor to cause the control unit to automatically: (i) select the engine thrust actuator in response to the control interface moving to the first portion of the control path; (ii) select the engine thrust actuator or the airbrake actuator in response to the control interface moving to the second portion and to the aircraft moving in a flying phase, (iii) select the landing actuator in response to the control interface moving to the second portion and to the aircraft moving in a ground movement phase, and (iv) generate control commands to the selected actuator to cause the selected actuator to adjust the energy applied to move the aircraft.

* * * * *